United States Patent
Rosenbaum

(10) Patent No.: US 7,320,492 B1
(45) Date of Patent: Jan. 22, 2008

(54) TELESCOPIC SUN VISOR EXTENSION SLEEVE

(75) Inventor: Richard W. Rosenbaum, Bloomfield Hills, MI (US)

(73) Assignee: Rederex Corporation, Birmingham, MI (US)

( * ) Notice: Subject to any disclaimer, the term of this patent is extended or adjusted under 35 U.S.C. 154(b) by 0 days.

(21) Appl. No.: 11/610,884

(22) Filed: Dec. 14, 2006

(51) Int. Cl.
*B60J 3/00* (2006.01)

(52) U.S. Cl. ..................... 296/97.6; 296/97.1

(58) Field of Classification Search ............... 296/97.1, 296/97.6, 97.8
See application file for complete search history.

(56) References Cited

U.S. PATENT DOCUMENTS

| | | | | |
|---|---|---|---|---|
| 3,649,068 A | * | 3/1972 | Moynihan | 296/97.8 |
| 3,809,428 A | * | 5/1974 | Cohen | 296/97.5 |
| 4,003,597 A | | 1/1977 | Acuff | |
| 4,169,552 A | * | 10/1979 | Lichtenstein et al. | 296/97.8 |
| 4,330,148 A | * | 5/1982 | LaMont | 296/97.6 |
| 4,489,974 A | | 12/1984 | Warhol | |
| 4,783,111 A | | 11/1988 | Hemmeke et al. | |
| 4,792,176 A | | 12/1988 | Karford | |
| 4,824,161 A | | 4/1989 | Lee et al. | |
| 4,828,314 A | | 5/1989 | Gavagan | |
| 4,989,910 A | | 2/1991 | Mersman et al. | |
| 4,998,767 A | * | 3/1991 | Lawassani et al. | 296/97.1 |
| 5,005,895 A | | 4/1991 | Muyres et al. | |
| 5,067,764 A | | 11/1991 | Lanser et al. | |
| 5,316,361 A | | 5/1994 | Miller | |
| 5,431,473 A | | 7/1995 | Hiemstra | |
| 5,445,427 A | | 8/1995 | Vandagriff | |
| 5,472,255 A | | 12/1995 | Moore | |
| 5,580,117 A | | 12/1996 | Goclowski | |
| 5,730,484 A | | 3/1998 | Robinson | |
| 5,749,618 A | | 5/1998 | Jones | |
| 5,871,252 A | | 2/1999 | Gute | |
| 5,884,684 A | | 3/1999 | Jefferson | |
| 5,951,091 A | | 9/1999 | VanderKuyl et al. | |
| 6,174,019 B1 | | 1/2001 | Collet et al. | |
| 6,176,539 B1 | | 1/2001 | Westerman | |
| 6,189,949 B1 | | 2/2001 | Miller et al. | |

(Continued)

*Primary Examiner*—Lori L. Lyjak
(74) *Attorney, Agent, or Firm*—Gifford, Krass, Sprinkle, Anderson & Citkowski, PC

(57) ABSTRACT

A laterally moveable set of sleeves are placed over an existing sun visor to more effectively block the rays of the sun through the front or side windows. A separate sleeve-set should be placed over the right sun visor. Any part of either sleeve may have an opaque, clear, tinted, shaded or mirror finish. The sleeves are preferably made of plastic, heavy paper or cardstock, folded along one long end, and sealed along the opposite long edge. In the event that dissimilar materials are used to construct the exterior-facing and interior-facing panels of a sleeve, glue, heat welding, or other techniques may be used to join the top and bottom edges. A textual or graphical logo or message may be inscribed upon any side of either the inner or outer sleeve. The message may be printed left to right on one side of the sleeve(s) for display in the side window, or reverse-reading to allow the driver ahead to read the message through their rear-view mirror. The side edges of each sleeve may both be open or one side edge may be closed to enhance rigidity. The upper and/or lower edges may extend several inches above and/or below the visor, and may be shortened as needed. Horizontal or vertical perforations may be printed along a sleeve so facilitate shortening.

18 Claims, 2 Drawing Sheets

U.S. PATENT DOCUMENTS

| | | |
|---|---|---|
| 6,231,108 B1 * | 5/2001 | Nicol ........................ 296/97.6 |
| 6,371,546 B1 | 4/2002 | Jefferson |
| 6,402,221 B1 | 6/2002 | Ogunjobi |
| 6,585,308 B2 | 7/2003 | Sturt et al. |
| 6,604,772 B2 | 8/2003 | Sturt |
| 6,705,661 B2 | 3/2004 | Amirmoini |
| 6,776,446 B1 | 8/2004 | Tutt |
| 7,044,531 B2 | 5/2006 | Schaad |
| 2004/0032143 A1 * | 2/2004 | Amirmoini ................ 296/97.6 |
| 2005/0046223 A1 * | 3/2005 | Virts et al. ................. 296/97.6 |
| 2005/0093329 A1 * | 5/2005 | Schaad ...................... 296/97.6 |
| 2006/0131916 A1 * | 6/2006 | Hammond et al. ........ 296/97.5 |

* cited by examiner

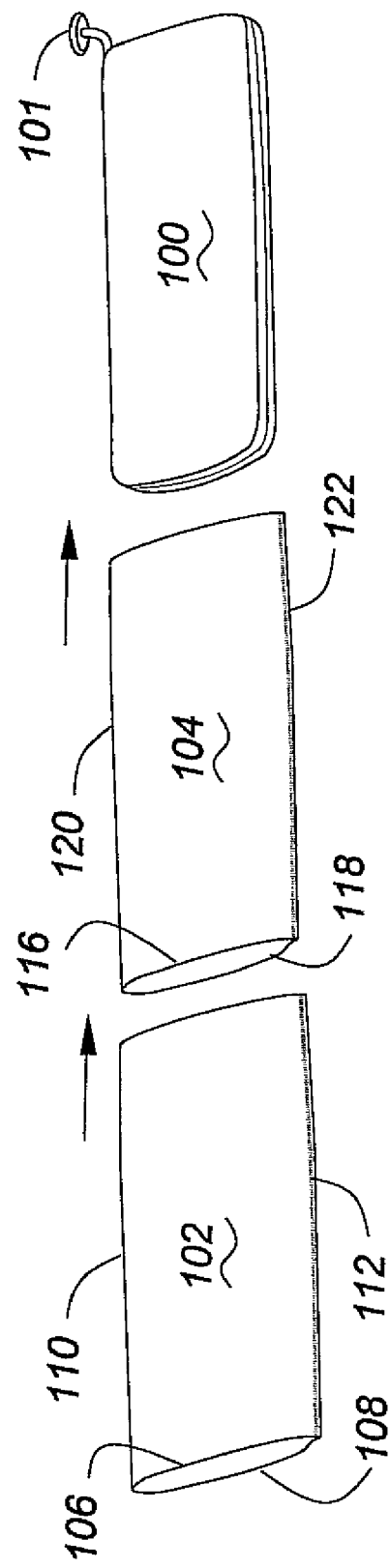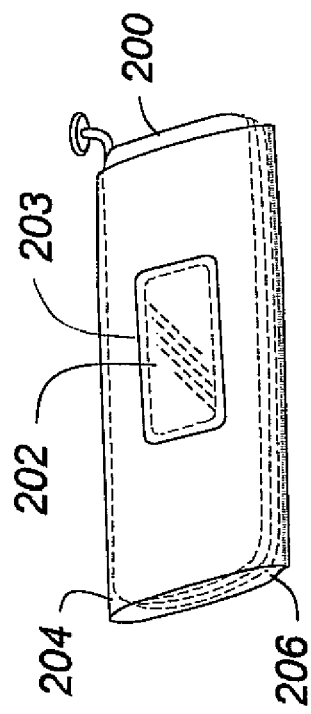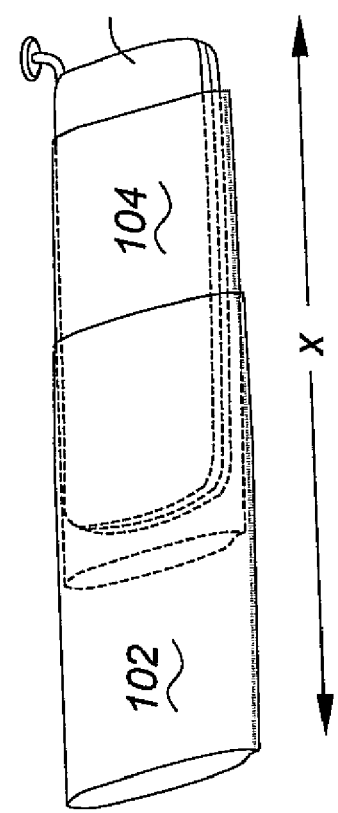

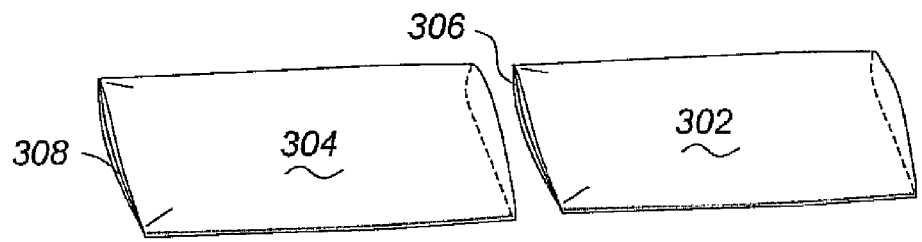
Fig - 3
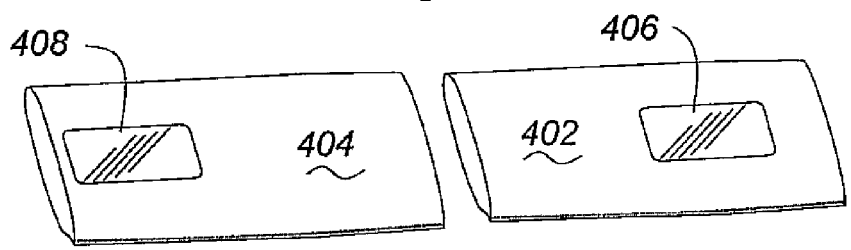
Fig - 4
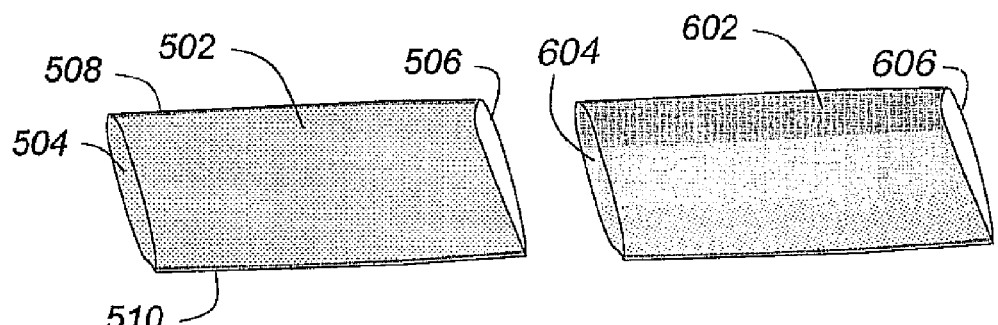
Fig - 5          Fig - 6
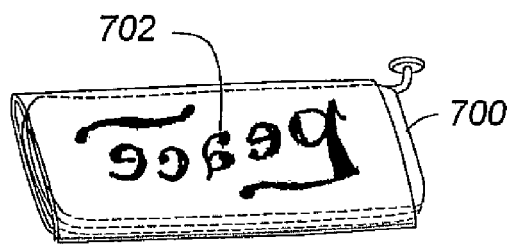   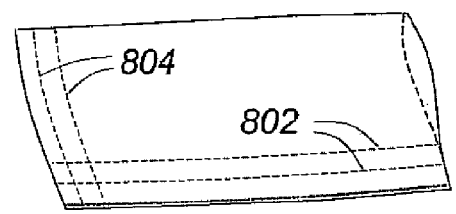
Fig - 7          Fig - 8

TELESCOPIC SUN VISOR EXTENSION SLEEVE

FIELD OF THE INVENTION

This invention relates generally to sun visors and, in particular, to a telescopic sun visor extension system.

BACKGROUND OF THE INVENTION

Sun visors are often neither long nor wide enough to block a blinding sun streaming through a windshield or side window. This problem is aggravated when a younger or shorter driver sits lower in the seat than would a typical adult driver. Drivers proceeding eastward in the morning or westward in the afternoon are often blinded by a rising or setting sun. Northbound and southbound drivers are challenged by a blinding rising or setting sun through a vehicle's side windows. When the sun streams through a stand of trees, the pulsating effect is particularly dangerous. Sun streaming through the passenger-side front or side windows can also be equally distracting.

SUMMARY OF THE INVENTION

This invention solves problems associated with excess sunlight and glare by providing a laterally moveable set of sleeves that are semi-permanently placed over an existing sun visor. One or both sleeves can be moved optionally as far left or right, as necessary, to block the rays of the sun through the front or side windows. A separate sleeve-set should be placed over the right sun visor. By providing a sleeve within a sleeve around the vehicle's sun visor, there is no need for clips or other means of attachment. Ideally the sleeve is as long as possible, but not so long as to prevent the anchoring of a visor.

Any part of either sleeve may have an opaque, clear, tinted, shaded or mirror finish. A typical sun visor measures 14"×5". Some are longer, wider or both; others have smaller dimensions. In any case, the sleeves according to the invention can easily be moved at least 12"-18" horizontally to the left or right. Both sleeves will always be wider than the visor, and may be shortened as desired, but are not so wide as to block the view of traffic or the views of the inside and outside mirrors. Different width sleeves may accommodate the needs of younger or shorter drivers. The outer sleeve will be longer than the inner sleeve, for ease of edge-gripping. The outer sleeve will be slightly wider than the inner sleeve. The inner sleeve will always be just wide enough to slip over the sun visor. Cutouts in both sleeves allow the visor to be anchored easily into its docking receptacle. A textual or graphical logo or message may be inscribed upon any side of either the inner or outer sleeve. The message may be printed left to right on one side of the sleeve(s) for display in the side window, or reverse-reading to allow the driver ahead to read the message through their rear-view mirror.

The sleeves are preferably made of plastic, heavy paper or cardstock, folded along one long end, and sealed along the opposite long edge. In the event that dissimilar materials are used to construct the exterior-facing and interior-facing panels of a sleeve, glue, heat welding, or other techniques may be used to join the top and bottom edges. The side edges of each sleeve may both be open or one side edge may be closed to enhance rigidity. The upper and/or lower edges may extend several inches above and/or below the visor, and may be shortened as needed. Horizontal or vertical perforations may be printed along a sleeve so facilitate shortening.

BRIEF DESCRIPTION OF THE DRAWINGS

FIG. 1A is a drawing of the preferred embodiment of the invention, showing two sleeves in exploded form;

FIG. 1B is a drawing of the preferred embodiment, showing the sleeves of FIG. 1A nested over each other and onto a visor to extend the same;

FIG. 2 is a drawing which shows an embodiment of the invention wherein the interior-facing layers of the sleeve may be transparent or cut out to facilitate the use of an existing vanity mirror;

FIG. 3 is a drawing that shows how one of the side edges of each sleeve may be closed as opposed to open;

FIG. 4 shows how a mirrored surface or mirror may be attached to the inner or outer sleeves to provide a supplemental vanity mirror and/or rear-view mirror, respectively;

FIG. 5 is a drawing which shows how the exterior facing layer of a sleeve according to the invention may be polarized or tinted;

FIG. 6 is a drawing similar to that shown in FIG. 5, illustrating a graduated tint;

FIG. 7 shows the exterior-facing panel of a driver's side visor, including textual or graphical material; and FIG. 8 is a drawing which shows the addition of texture or graphical indicia on the external facing layer of the outermost sleeve, thereby providing a message to other vehicles.

DETAILED DESCRIPTION OF THE INVENTION

Turning now to the drawings, FIG. 1A is an exploded view illustrating the preferred embodiment of the invention. A typical vehicle visor, in this case on the passenger side, is indicated at 100. The visor 100 typically attaches to an inner roof portion of a vehicle through a swivel hinge such as 101, though the invention is not limited in regards to the size of the visor or the way in which it attaches to the vehicle.

The preferred embodiment includes an inner sleeve 104 having an interior-facing panel 116 and an exterior-facing panel 118, these being joined along the top edge 120 and the bottom edge 122. The preferred embodiment further includes an outer sleeve 102, also having an exterior-facing panel 108 and an interior-facing panel 106, joined at the top edge 110 and bottom edge 112. The inner and outer sleeves can be constructed of any suitable material, so long as a rigid or at least semi-rigid assembly results facilitating extension shown in FIG. 1B without drooping or sagging.

The sleeves may be made of the same material, or different materials depending upon the different embodiments disclosed herein. Each of the sleeves 102, 104 may be constructed of a single piece of plastic, cardstock or the like, folded over at the top or bottom edge and glued, taped or thermally welded along the bottom edge, or vice versa. Alternatively, if a combination of opaque or semi-opaque outer layers are used with more transparent inner layers, gluing or welding along both the top and bottom edges may be more appropriate.

Although in the preferred embodiment only two nesting sleeves are shown, the invention may be extended to three or even more sleeves, depending upon the application. Referring to FIG. 1B, assuming a typical visor 100 is on the order of twelve to fourteen inches wide, the use of sleeves 102, 104 would result in a width extension "X" easily doubling the effective width of the visor, thereby dramatically reducing glare problems.

Turning now to FIG. 2, a typical vehicle visor is indicated at 200. To accommodate an existing vanity mirror in the vehicle, the exterior-facing panel 206 may be opaque or semi-opaque, with the interior-facing panel 204 being substantially transparent, allowing an occupant to see a mirror 202 through the interior-facing panel of one or both sleeves. In the event that the vanity mirror has a flip-up covers as is now typical, a cutout 203 may be provided in both sleeves, in which case the interior-facing panel 204 may be opaque or semi-opaque as well.

As shown in FIG. 3, inner sleeve 302 and outer sleeve 304 need not have open edges 306, 308, but instead, may be taped, glued or heat sealed. Depending upon the material used, this may further add to desired rigidity. FIG. 4 shows how an inner sleeve 402 may be provided with a mirrored surface or mirror 406 on the interior facing portion, thereby providing a supplemental vanity mirror in the event that inner sleeve 402 covers an existing vanity mirror. Likewise, outer sleeve 404 may include a mirrored surface or mirror 408 to provide an additional or supplemental rear-view mirror. Although small sections 406, 408 are shown, the entire interior facing surfaces may be made reflective, as with silvered Mylar, or the like.

FIG. 5 shows an alternative embodiment of the invention at 502, wherein the exterior-facing panel 504 is polarized or tinted. Interior-facing panel 506 may, of course, be polarized or tinted as well, though other materials which are opaque, semi-opaque or transparent may instead be used, with edges 508, 510 being glued or otherwise joined together. FIG. 6 shows a further alternative embodiment generally at 602, wherein the exterior-facing panel 604 includes a graduated tint, either from top to bottom or bottom or top. Inwardly facing panel 606 may be opaque, semi-opaque or transparent.

FIG. 7 is a drawing which shows the exterior-facing panel 702 of a driver's side visor 700, including textual or graphical material. Such messages may be forward-reading or backward-reading, as shown, such that the driver in front of the person using the invention may see a forward-reading message through their rear-view mirror.

FIG. 8 illustrates yet a further alternative embodiment of the invention, wherein score lines 802 and 804 are provided on sleeve 800, thereby enabling a user to easily detach portions to reduce the size of the sleeve, thereby conveniently accommodating different makes and models of vehicles.

I claim:

1. An extension system for a vehicle visor having a height and a width, the system comprising:
    an inner sleeve having an exterior-facing panel and an interior-facing panel, the panels having top, bottom and side edges, at least the top and bottom edges being joined creating a side opening, the size of the panels being such that the inner sleeve may slide over a vehicle visor through the side opening; and
    an outer sleeve having an exterior-facing panel and an interior-facing panel, the panels having top, bottom and side edges, at least the top and bottom edges being joined creating a side opening, the size of the panels being such that the inner sleeve may slide the inner sleeve through the side opening;
    whereby the inner and outer sleeves may be substantially nested over one another on the visor or adjustable extended to enhance the blocking of light and glare.

2. The system of claim 1, wherein:
    one of the top or bottom edges is created through folding; and
    the opposing top or bottom edge is created through taping, gluing, heat welding or other techniques.

3. The system of claim 1, wherein one or both of the inner and outer sleeves are composed of plastic or card stock.

4. The system of claim 1, wherein the interior and exterior-facing panels of the inner and outer sleeves are substantially opaque.

5. The system of claim 1, wherein at least the exterior-facing panel of one or both sleeves is opaque or tinted.

6. The system of claim 1, wherein:
    the exterior-facing panel of one or both sleeves is opaque or tinted; and
    the interior-facing panel of one or both sleeves is transparent or semi-transparent.

7. The system of claim 1, wherein at least the exterior-facing panel of one or both sleeves is polarized.

8. The system of claim 1, wherein:
    the exterior-facing panel of one or both sleeves is polarized; and
    the interior-facing panel of one or both sleeves is transparent or semi-transparent.

9. The system of claim 1, wherein at least the exterior-facing panel of one or both sleeves has a graduated tint.

10. The system of claim 1, wherein:
    the exterior-facing panel of one or both sleeves has a graduated tint; and
    the interior-facing panel of one or both sleeves is transparent or semi-transparent.

11. The system of claim 1, wherein the interior-facing panel of the inner sleeve includes a mirrored surface.

12. The system of claim 1, wherein the interior-facing panel of the outer sleeve includes a mirrored surface.

13. The system of claim 1, wherein the interior-facing panel of the inner sleeve includes a cut-out to facilitate use of an existing vanity mirror.

14. The system of claim 1, wherein the interior-facing panel of the outer sleeve includes a cut-out to facilitate use of an existing vanity mirror.

15. The system of claim 1, wherein at least the outer sleeve includes perforations to reduce the size of that sleeve.

16. The system of claim 1, wherein the exterior-facing panel, of the inner and outer sleeve, or both, includes textual or graphical indicia.

17. The system of claim 1, wherein the exterior-facing panel of the inner or outer sleeve, or both, includes reverse-reading text.

18. The system of claim 1, wherein a portion of one or both sleeves is cut out to allow the visor to be anchored in its docking station.

\* \* \* \* \*